(12) United States Patent
Fukawatase et al.

(10) Patent No.: US 7,810,841 B2
(45) Date of Patent: Oct. 12, 2010

(54) AIRBAG APPARATUS

(75) Inventors: Osamu Fukawatase, Nishikamo-gun (JP); Akiyoshi Sanada, Nishikamo-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 82 days.

(21) Appl. No.: 12/359,400

(22) Filed: Jan. 26, 2009

(65) Prior Publication Data

US 2009/0189374 A1    Jul. 30, 2009

(30) Foreign Application Priority Data

Jan. 25, 2008    (JP) .............................. 2008-015589

(51) Int. Cl.
   - B60R 21/276    (2006.01)
   - B60R 21/16    (2006.01)
   - B60R 21/26    (2006.01)

(52) U.S. Cl. .................... 280/739; 280/740; 280/743.2

(58) Field of Classification Search ................ 280/739, 280/740, 743.1, 743.2; B60R 21/276
See application file for complete search history.

(56) References Cited

U.S. PATENT DOCUMENTS

| | | | |
|---|---|---|---|
| 6,648,371 B2 * | 11/2003 | Vendely et al. | 280/739 |
| 6,863,304 B2 * | 3/2005 | Reiter et al. | 280/739 |
| 7,328,915 B2 * | 2/2008 | Smith et al. | 280/739 |
| 7,413,218 B2 * | 8/2008 | Ekdahl | 280/739 |
| 7,628,422 B2 * | 12/2009 | Fukawatase et al. | 280/739 |
| 2003/0020268 A1 * | 1/2003 | Reiter et al. | 280/742 |
| 2004/0130135 A1 | 7/2004 | Ekdahl | |
| 2007/0045997 A1 * | 3/2007 | Abe et al. | 280/729 |
| 2009/0212538 A1 * | 8/2009 | Abe et al. | 280/729 |
| 2010/0078924 A1 * | 4/2010 | Mitsuo et al. | 280/743.2 |

FOREIGN PATENT DOCUMENTS

| | | | |
|---|---|---|---|
| JP | 6286570 A | * | 10/1994 |
| JP | 2002211348 A | | 7/2002 |
| JP | 2004155420 | | 6/2004 |
| JP | 2007276535 A | * | 10/2007 |
| JP | 2008308139 A | * | 12/2008 |
| JP | 2009040206 A | * | 2/2009 |
| JP | 2009113757 A | * | 5/2009 |

* cited by examiner

*Primary Examiner*—Paul N. Dickson
*Assistant Examiner*—Joselynn Y. Sliteris
(74) *Attorney, Agent, or Firm*—Gifford, Krass, Sprinkle, Anderson & Citkowski, P.C.

(57) ABSTRACT

An airbag apparatus includes an airbag with a first hole and a second hole; a tube vent disposed outside the airbag, wherein a proximal end portion of the tube vent is connected to a portion of the airbag, which is located around the first hole, so that communication is provided between an inside of the tube vent and an inside of the airbag through the first hole, and a distal end portion of the tube vent is inserted from the outside of the airbag into the inside of the airbag through the second hole; and a holding portion that holds the distal end portion of the tube vent from the inside of the airbag, wherein when the airbag is inflated and deployed, and the holding portion releases the tube vent, the distal end portion of the tube vent moves out of the second hole.

8 Claims, 9 Drawing Sheets

AIRBAG APPARATUS

INCORPORATION BY REFERENCE

The disclosure of Japanese Patent Application No. 2008-015589 filed on Jan. 25, 2008 including the specification, drawings and abstract is incorporated herein by reference in its entirety.

BACKGROUND OF THE INVENTION

1. Field of the Invention

The invention relates to an airbag apparatus which is provided in a vehicle, and in which an airbag is deployed ahead of an occupant, for example, when a vehicle is rapidly decelerated.

2. Description of the Related Art

In an airbag of an airbag apparatus described in Japanese Patent Application Publication No. 2004-155420 (JP-A-2004-155420), a cylindrical tube is provided in a manner such that a distal end of the tube is positioned inside the airbag. Further, the distal end of the tube is held by, for example, a clamp. Even when the airbag is in an inflated and deployed state, the tube remains positioned inside the airbag. When the tube is held inside the airbag that is in the inflated and deployed state, the tube remains flattened by the pressure of gas in the airbag.

If the clamp releases the tube when the airbag is in the inflated and deployed state, the tube protrudes to the outside of the airbag due to the pressure in the airbag. Further, the tube is inflated by the pressure of the gas in the airbag. When the airbag apparatus is in this state, the gas in the airbag flows from a proximal end to the distal end of the tube, and the gas is discharged to the outside of the airbag. Thus, the pressure of the gas in the airbag is adjusted.

In the configuration described in the publication No. 2004-155420, when the distal end of the tube is held in the airbag, the tube is flattened by the pressure of the gas in the airbag. However, the gas in the airbag leaks through the tube when the airbag is in an initial inflated deployed state (that is, during a period from when the airbag starts to be inflated and deployed until when the airbag is sufficiently inflated and deployed). Therefore, the size of a gas generator that supplies the gas into the airbag, such as an inflator, needs to be increased to quickly inflate and deploy the airbag.

Also, in the configuration described in the publication No. 2004-155420, when the tube, which has been in the airbag, protrudes to the outside of the airbag, the tube is gradually reversed from the proximal end portion (that is, the tube is turned inside out so that a portion, which has been the inner periphery of the tube, is changed to the outer periphery of the tube, and a portion, which has been the outer periphery of the tube, is changed to the inner periphery of the tube). Therefore, when a timing, at which the tube is released in the airbag, is set, it is necessary to take into account a time required to reverse the tube. This makes it difficult to set the timing at which the tube is released.

SUMMARY OF THE INVENTION

The invention provides an airbag apparatus in which an airbag is quickly inflated and deployed without the need of increasing the size of a gas generator, and gas is quickly discharged from the airbag after the tube vent is released.

A first aspect of the invention relates to an airbag apparatus that includes an airbag which is inflated and deployed when gas is supplied into the airbag and a pressure in the airbag is increased, and in which a first hole and a second hole are formed, wherein each of the first hole and the second hole provides communication between an inside of the airbag and an outside of the airbag; a tube vent with a cylindrical shape disposed outside the airbag, wherein a proximal end portion of the tube vent is connected to a portion of the airbag, which is located around the first hole, so that communication is provided between an inside of the tube vent and the inside of the airbag through the first hole, and a distal end portion of the tube vent is inserted from the outside of the airbag into the inside of the airbag through the second hole; and a holding portion that holds the distal end portion of the tube vent from the inside of the airbag, wherein when the airbag is inflated and deployed, and the holding portion releases the tube vent, the distal end portion of the tube vent moves out of the second hole so that the tube vent protrudes to the outside of the airbag.

In the above-described aspect, when the gas is supplied into the airbag, the pressure in the airbag is increased, and accordingly, the airbag is inflated and deployed. The second hole is formed in the airbag. The tube vent is disposed outside the airbag, and the distal end portion of the tube vent is inserted through the second hole. Thus, the entire second hole or a large part of the second hole is closed. This restricts discharge of the gas through the second hole. Further, the proximal end portion of the tube vent is connected to the portion of the airbag, which is located around the first hole. Therefore, as the airbag is inflated and deployed, the tube vent is inflated by the pressure of the gas that flows into the tube vent through the first hole. As a result, the second hole is more effectively closed. Thus, it is possible to effectively restrict the discharge of the gas through the second hole, when the airbag is inflated and deployed.

When the airbag is inflated and deployed, and the holding portion releases the distal end portion of the tube vent, the distal end portion of the tube vent moves out of the airbag so that the tube vent protrudes to the outside of the airbag due to the pressure of the gas in the tube vent. As a result, the second hole, which has been closed by the tube vent, is opened, and the gas in the airbag is discharged to the outside of the airbag through the second hole.

Thus, in the airbag apparatus according to the above-described aspect, when the distal end portion of the tube vent is held, it is possible to restrict the discharge of the gas through the second hole during a period in which the airbag is inflated and deployed. Accordingly, it is possible to quickly inflate and deploy the airbag without the need of increasing the size of a gas generator that supplies gas into the airbag.

Further, during a period from when the holding portion releases the tube vent until when the second hole is opened, the distal end portion of the tube vent simply moves out of the second hole so that the tube vent protrudes to the outside of the airbag due to the pressure in the airbag. That is, the tube vent is not reversed. Therefore, it is possible to quickly open the second hole.

In the above-described aspect, the airbag may include a first side foundation cloth positioned in one side of the airbag in a width direction of a vehicle when the airbag is in an inflated and deployed state, a second side foundation cloth positioned in the other side of the airbag in the width direction of the vehicle when the airbag is in the inflated and deployed state, and an outer peripheral foundation cloth that connects an outer periphery of the first side foundation cloth to an outer periphery of the second side foundation cloth. The first hole, the second hole, and the tube vent may be provided in at least one of the first side foundation cloth and the second foundation cloth.

In the above-described aspect, the tube vent may be a dummy tube vent whose distal end is closed.

In the airbag apparatus according to the above-described aspect, a distal end of the tube vent may be open.

In the airbag apparatus according to the above-described aspect, the distal end of the tube vent is open. However, the distal end portion of the tube vent, which is held by the holding portion, is inserted into the airbag through the second hole. Therefore, even when then gas supplied into the airbag passes through the first hole and the tube vent, the gas is supplied into the airbag again. When the airbag apparatus is in this state, this suppresses leakage of the gas in the airbag to the outside of the airbag through the first hole and the tube vent.

When the airbag is inflated and deployed, and the holding portion releases the tube vent, the distal end portion of the tube vent moves out of the second hole so that the tube vent protrudes to the outside of the airbag due to the pressure of the gas. As a result, the second hole is opened, and the gas in the airbag is discharged to the outside of the airbag through the second hole. In addition, because the distal end of the tube vent is positioned outside the airbag, the gas in the airbag is discharged to the outside of the airbag through the first hole and the tube vent.

Thus, in the airbag apparatus according to the above-described aspect, the gas is discharged not only through the second hole but also through the first hole and the tube vent. Therefore, it is possible to quickly adjust the pressure in the airbag.

In the airbag apparatus according to the above-described aspect, an inner diameter of the second hole may be larger than an inner diameter of the first hole.

In the airbag apparatus according to the above-described aspect, the first hole and the second hole are formed in the airbag. The first hole corresponds to the proximal end portion of the tube vent. The distal end portion of the tube vent is inserted through the second hole. The inner diameter of the second hole is larger than the inner diameter of the first hole. Therefore, when the holding portion releases the distal end portion of the tube vent, and the tube vent protrudes to the outside of the airbag, the tube vent does not suffer great interference from the inner peripheral portion of the second hole, and the distal end portion of the tube vent smoothly moves out of the second hole.

In the airbag apparatus according to the above-described aspect, when the tube vent is inserted through the second hole, the second hole may be larger than an outer peripheral shape of a cross section of the tube vent taken along a radial direction of the second hole at a position corresponding to a position of the second hole.

In the airbag apparatus according to the above-described aspect, the distal end portion of the tube vent is inserted into the airbag through the second hole. When the tube vent is inserted into the airbag through the second hole, the second hole is larger than the outer peripheral shape of the cross section of the tube vent taken along the radial direction of the second hole at the position corresponding to the position of the second hole. Therefore, the tube vent does not suffer great interference from the inner peripheral portion of the second hole when the tube vent is inflated. Accordingly, the tube vent is sufficiently inflated.

Further, even when the tube vent is in the inflated state, the tube vent does not suffer unnecessarily great interference from the inner peripheral portion of the second hole. Therefore, when the holding portion releases the distal end portion of the tube vent, and the tube vent protrudes to the outside of the airbag, the tube vent does not suffer great interference from the inner peripheral portion of the second hole, and the distal end portion of the tube vent smoothly moves out of the second hole.

In the above-described aspect, the first hole and the second hole may be formed in a manner such that there is a predetermined distance between the first hole and the second hole in a longitudinal direction of a vehicle when the airbag is in an inflated and deployed state.

In the above-described aspect, the first hole may be positioned closer to a rear of the vehicle than the second hole is.

In the airbag apparatus according to the above-described aspect, the second hole may be a long hole, and a longitudinal direction of the second hole may extend in the longitudinal direction of the vehicle; and the tube vent may be inserted through the second hole in a manner such that the tube vent is inclined with respect to a portion of a surface of the airbag, the portion of the surface being located around the second hole. The long hole may be any hole, as long as the length of the hole in the longitudinal direction is longer than the length of the hole in the height direction. The long hole may be a rectangular hole or an elliptical hole.

In the airbag apparatus according to the above-described aspect, the tube vent is inserted through the second hole in a manner such that in a manner such that the tube vent is inclined with respect to the portion of the surface of the airbag, the portion of the surface being located around the second hole. Therefore, when the distal end portion of the tube vent is held, the long second hole is substantially closed. Also, when the distal end portion of the tube vent is released, the distal end portion of the tube vent moves in the longitudinal direction of the second hole, and thus, the distal end portion of the tube vent smoothly moves out of the second hole.

In the airbag apparatus according to the above-described aspect, an outer diameter of the distal end portion of the tube vent, which is inserted through the second hole, may be smaller than an inner diameter of the second hole.

In the airbag apparatus according to the above-described aspect, even when the tube vent is in the inflated state, the tube vent does not suffer unnecessarily great interference from the inner peripheral portion of the second hole. Therefore, when the holding portion releases the distal end portion of the tube vent, and the tube vent protrudes to the outside of the airbag, the tube vent does not suffer great interference from the inner peripheral portion of the second hole, and the distal end portion of the tube vent smoothly moves out of the second hole.

In the airbag apparatus according to the above-described aspect, the tube vent may be tapered, and the tube vent may become narrower toward the distal end portion.

In the airbag apparatus according to the above-described aspect, it is possible to greatly reduce the interference from the inner peripheral portion of the second hole when the distal end portion of the tube vent moves out of the second hole. Thus, the tube vent even more smoothly protrudes.

In the airbag apparatus according to the above-described aspect, the holding portion may include a tether, and a tether holding device that holds and releases the tether; and the distal end portion of the tube vent may be connected to the tether holding device by the tether.

In the airbag apparatus according to the above-described aspect, it is possible to hold and release the tether based on a sensor signal input to the tether holding device.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
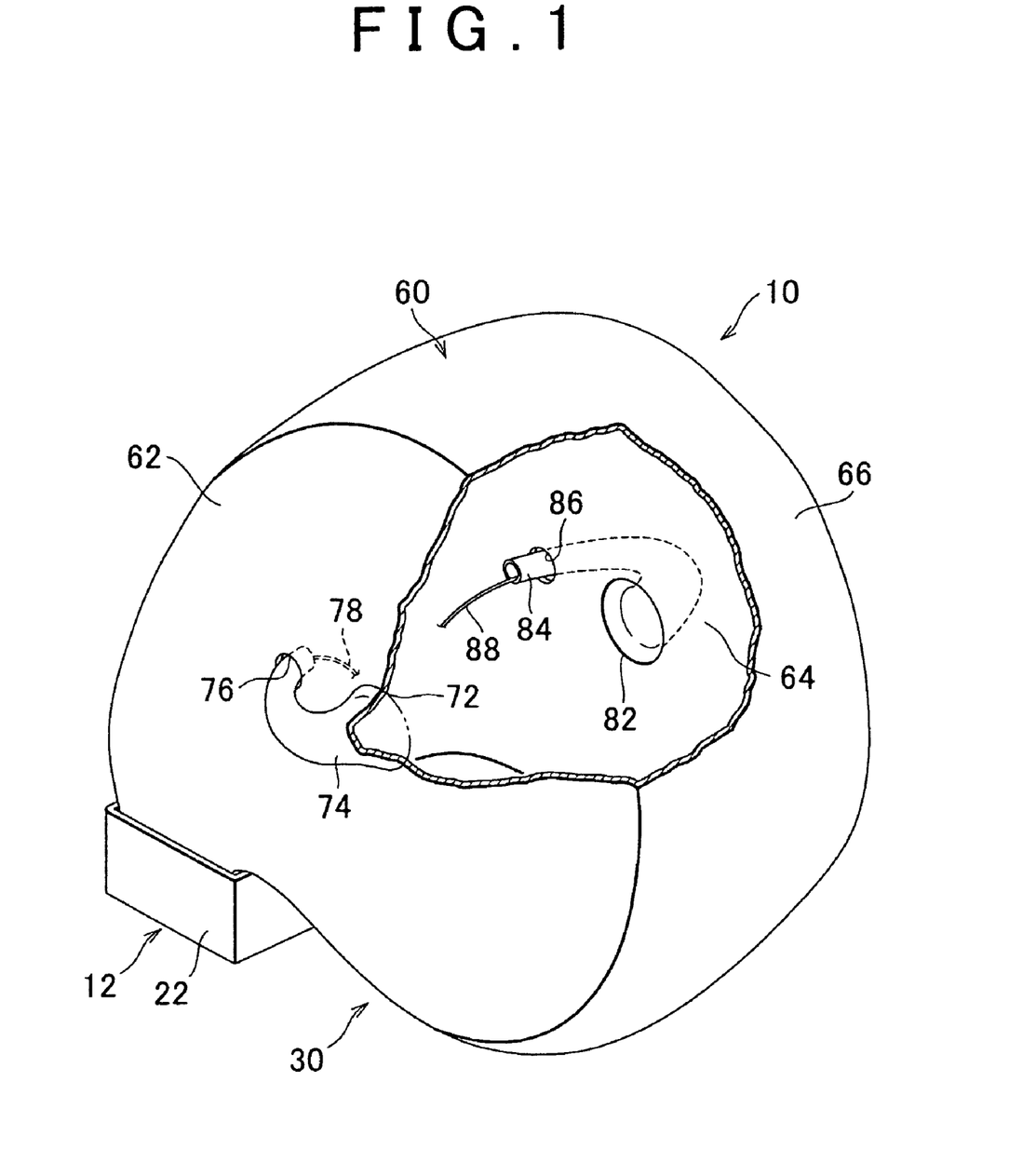
FIG. 1 is a perspective view showing an airbag apparatus according to a first embodiment.
Figure 5:
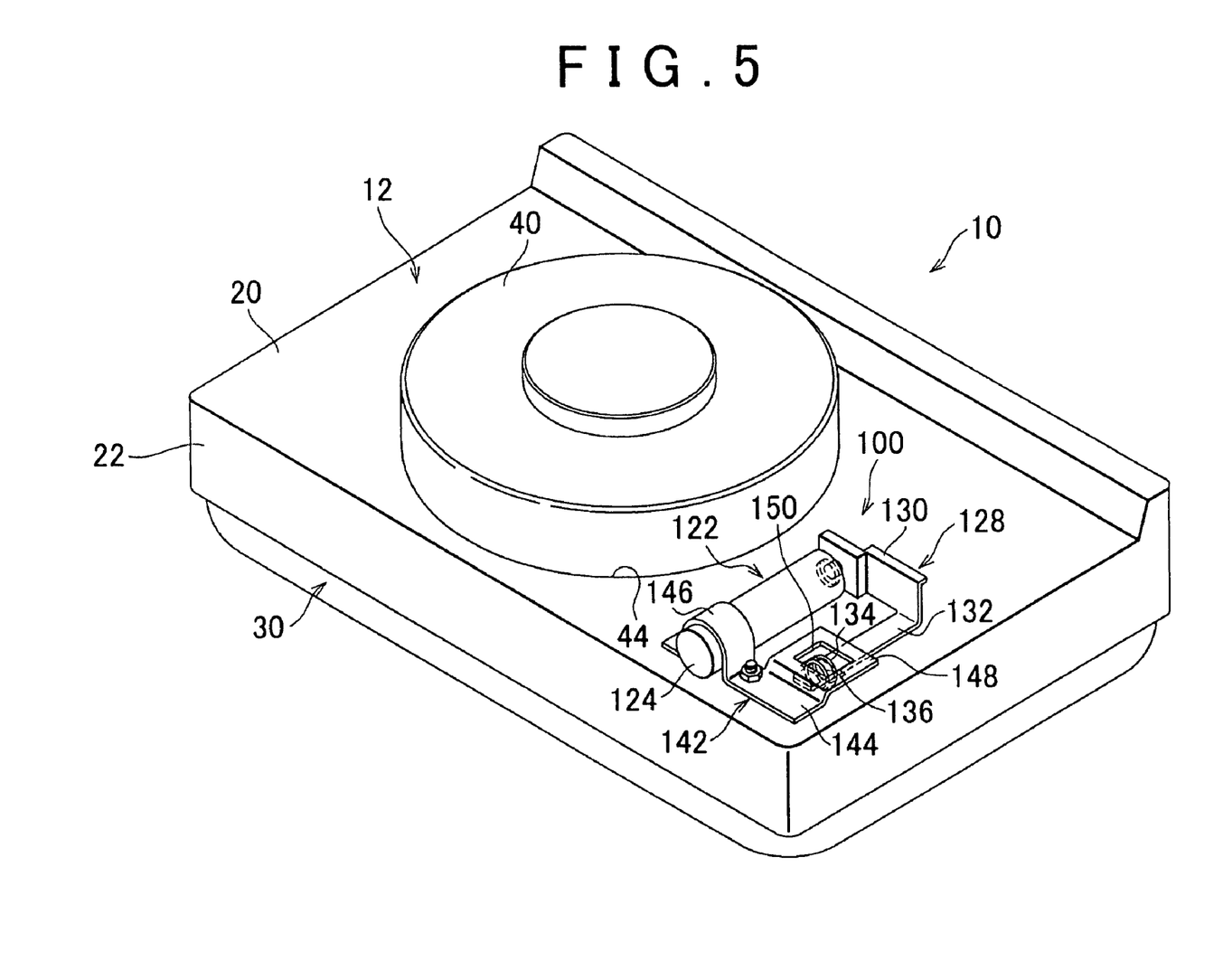
FIG. 5 is a perspective view showing the airbag apparatus according to the first embodiment seen from the rear surface side thereof when the airbag is folded.

[Configuration in first embodiment] FIG. 1 is a perspective view showing a main portion of an airbag apparatus 10 according to a first embodiment of the invention. FIG. 5 is a perspective view showing the airbag apparatus 10 seen from the rear side thereof. In FIG. 1, an airbag 30 described later is deployed, and in FIG. 5, the airbag 30 is folded.

Figure 2:
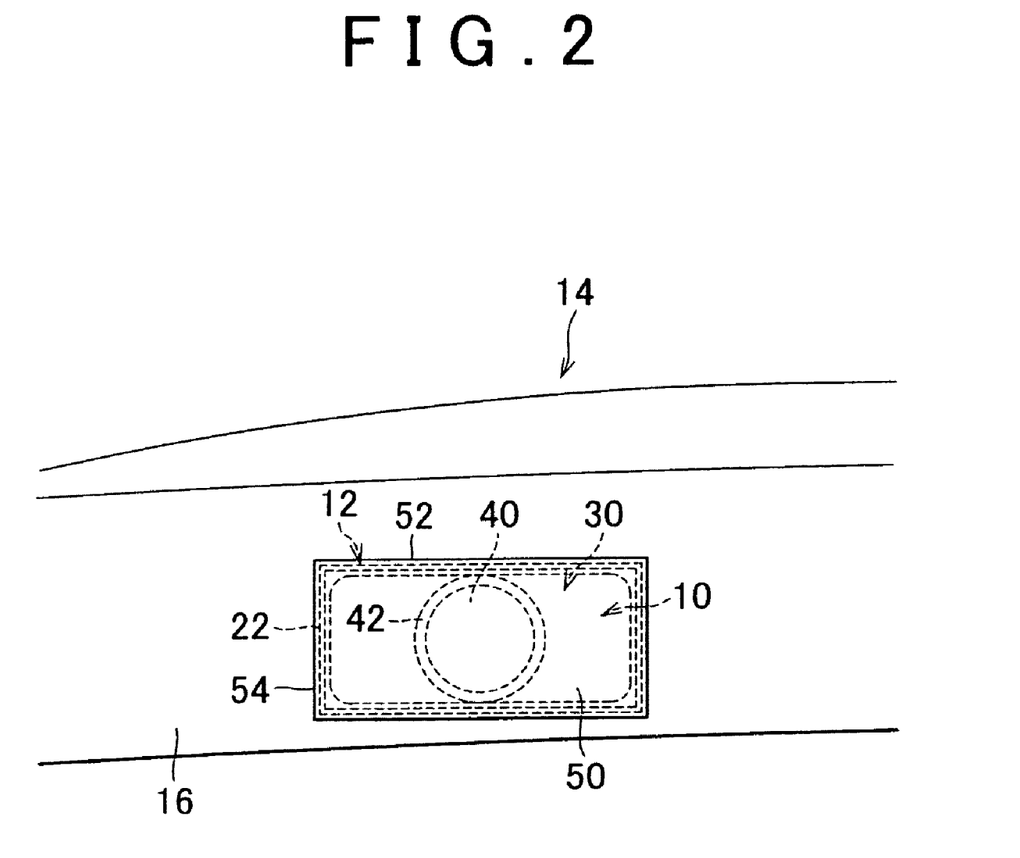
FIG. 2 is a plan view showing a location where the airbag apparatus according to the first embodiment is installed in a vehicle cabin when the airbag apparatus is not operated.

As shown in FIG. 1 and FIG. 5, the airbag apparatus 10 includes a base plate 12. As shown in FIG. 2, when the airbag apparatus 10 is a passenger-side airbag in a vehicle 14, the base plate 12 is fixed to a vehicle body structure member such as a reinforcement on the rear surface side of an instrument panel 16 of the vehicle 14. Also, although detailed illustration is omitted, when the airbag apparatus 10 is a driver-side airbag in the vehicle 14, the base plate 12 is disposed inside a rim of a steering wheel, and fixed to, for example, a spoke of the steering wheel.

The base plate 12 includes a bottom wall 20 that is substantially rectangular in a planar view. A peripheral wall 22 extends upward (downward in FIG. 5) from an outer peripheral portion of the bottom wall 20. The airbag 30 in a folded state is provided in the base plate 12. An open end of the airbag 30 is fixed to the bottom wall 20 at a position inside the peripheral wall 22 using, for example, a bracket. An inflator 40 is provided in the base plate 12. A body portion of the inflator 40 has a substantially disc shape, or a substantially columnar shape whose axial length is relatively short.

Figure 3:
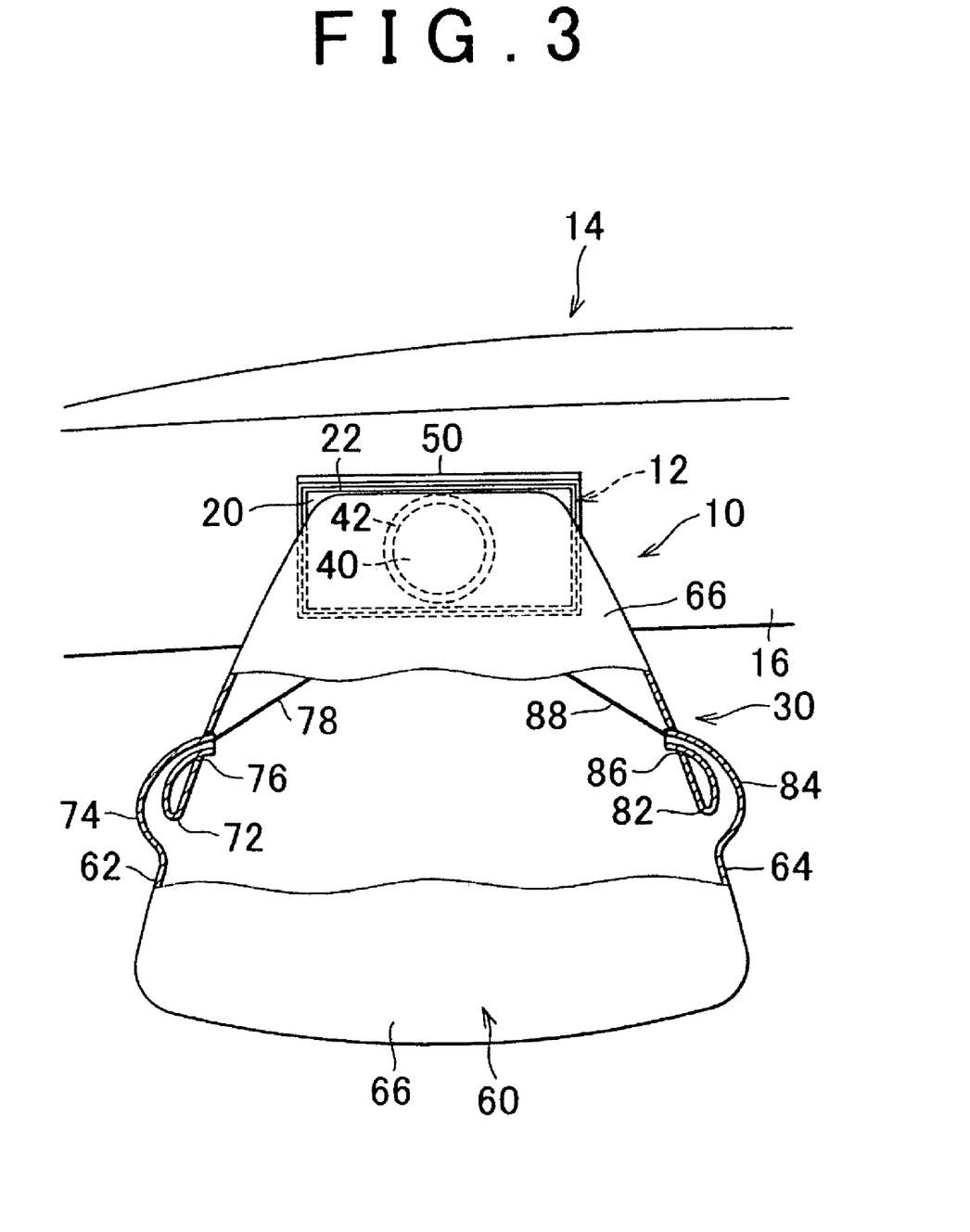
FIG. 3 is a plan view showing the airbag apparatus according to the first embodiment when distal end portions of tube vents remain held, and an airbag is in an inflated and deployed state, FIG. 3 corresponding to FIG. 2.
Figure 4:
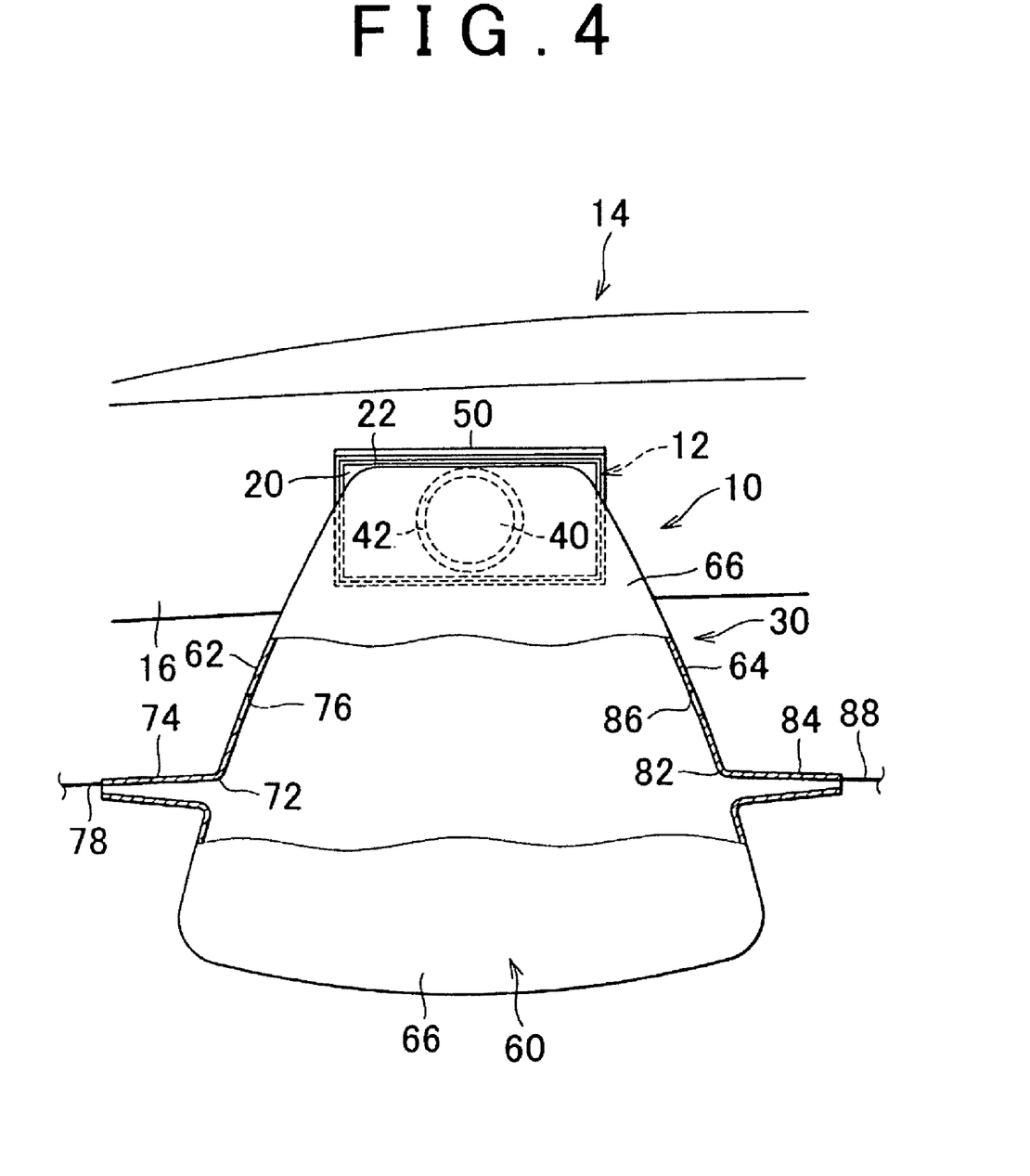
FIG. 4 is a plan view showing the airbag apparatus according to the first embodiment when the distal end portions of the tube vents are released, and the tube vents protrude to the outside of the airbag, FIG. 4 corresponding to FIG. 2.

A flange portion 42 is formed in an axial intermediate portion of the body portion of the inflator 40 as shown in FIG. 2 to FIG. 4 (the flange portion 42 is omitted in FIG. 5). Further, a portion of the body portion of the inflator 40, which is located below the flange portion 42 (i.e., a portion of the body portion, which is located above the flange portion 42 in FIG. 5), is inserted through a circular hole 44 formed in the bottom wall 20. Thus, the portion of the inflator 40 is inserted through the circular hole 44, and the flange portion 42 contacts the upper surface of the bottom wall 20. The inflator 40 is fixed to the bottom wall 20 in a manner such that sealing is provided between the circular hole 44 and the inflator 40.

The inflator 40, which is thus attached to the base plate 12, is positioned inside the open end portion of the airbag 30 that is in the folded state. When the inflator 40 is operated, the inflator 40 generates gas instantaneously, and further, the generated gas is discharged to the outside of the inflator 40 from a portion of the inflator 40, which is located above the bottom wall 20 (i.e., a portion of the inflator 40, which is located below the bottom wall 20 in FIG. 5). The airbag 30 is inflated by the pressure of the gas thus discharged from the inflator 40.

As shown in FIG. 2, an airbag door 50, which faces the airbag apparatus 10, is formed in the instrument panel 16 of the vehicle 14. The airbag door 50 is rectangular in a planar view. The outer peripheral shape of the airbag door 50 is larger than the outer peripheral shape of the peripheral wall 22 (i.e., the outer peripheral shape of the base plate 12). A hinge portion 52 is formed at a boundary between an upper portion of the airbag door 50 and a portion of the instrument panel 16 other than the airbag door 50. The hinge portion 52 of the instrument panel 16 is thinner than the portion of the instrument panel 16 other than the hinge portion 52. Thus, the mechanical strength of the hinge portion 52 is lower than that of the portion of the instrument panel 16 other than the hinge portion 52.

A breaking portion 54 is formed at a boundary between the right, left and lower portions of the airbag door 50, and a portion of the instrument panel 16 other than the airbag door 50. The breaking portion 54 of the instrument panel 16 is even thinner than the hinge portion 52 of the instrument panel 16. Thus, the mechanical strength of the breaking portion 54 is even lower than that of the hinge portion 52.

When the airbag 30 is inflated by the pressure of the gas supplied from the inflator 40 as described above, and the inflated airbag 30 presses the airbag door 50 from the rear surface side of the instrument panel 16, the instrument panel 16 is broken at the breaking portion 54, and further, the airbag door 50 pivots around the hinge portion 52. Thus, the instrument panel 16 is opened at a position at which the airbag door 50 is provided, and accordingly, the inflated airbag 30 is deployed toward a cabin of the vehicle 14.

As shown in FIG. 1, the airbag 30 includes a bag body 60. The bag body 60 includes a side foundation cloth 62 whose outer surface substantially faces toward one side in a width direction of the vehicle 14 when the airbag 30 is in the inflated and deployed state, and a side foundation cloth 64 whose outer surface substantially faces toward the other side in the width direction of the vehicle 14 when the airbag 30 is in the inflated and deployed state. The outer periphery of the side foundation cloth 62 and the outer periphery of the side foundation cloth 64 are connected to each other by an outer peripheral foundation cloth 66, except for portions of the outer peripheries of the side foundation cloths 62 and 64 at the open end of the airbag 30. Thus, the entire bag body 60 has a bag shape.

As shown in FIG. 1 and FIG. 3, a first hole 72 is formed in the side foundation cloth 62. A tube vent 74 with a cylindrical shape, which corresponds to the first hole 72, is provided in the side foundation cloth 62. In the embodiment, both ends of the tube vent 74 are open. Further, when the airbag 30 is in the deployed state, the tube vent 74 gradually becomes narrower from a proximal end portion toward a distal end portion. The proximal end portion of the tube vent 74 (i.e., the open end at the proximal end side) is connected to the peripheral edge of the first hole 72. Communication is provided between the tube vent 74 and the inside of the bag body 60 through the first hole 72.

Figure 6:
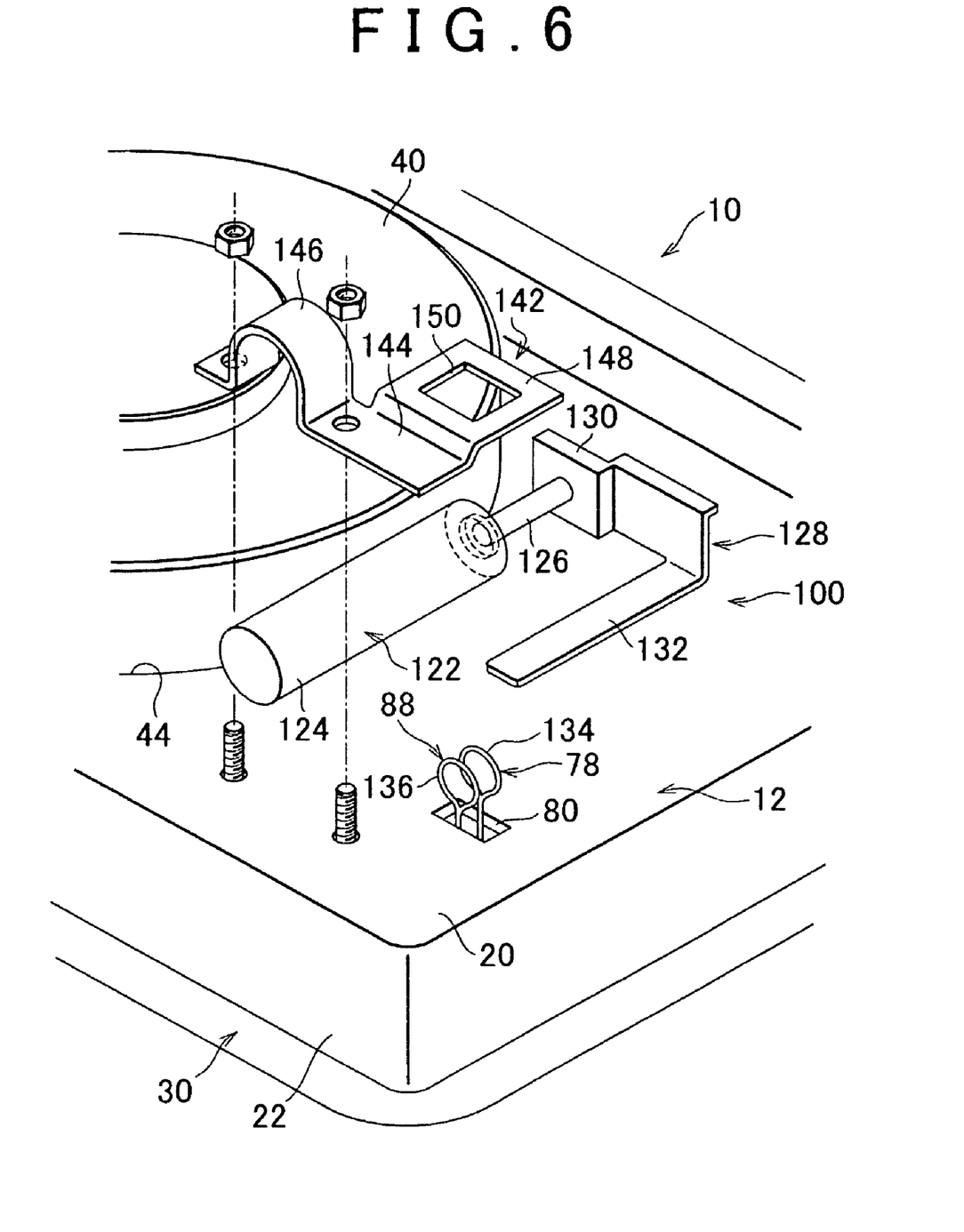
FIG. 6 is an enlarged perspective view showing a configuration of a holding device.

As shown in FIG. 1 and FIG. 3, a second hole 76 is formed on a side of the first hole 72 in the side foundation cloth 62 (particularly in the embodiment, the second hole 76 is positioned ahead of the first hole 72 when the airbag 30 is in the inflated and deployed state). The second hole 76 is positioned at a predetermined distance from the first hole 72. A portion of the tube vent 74 on the distal end side of the proximal end portion is positioned outside the bag body 60. However, the distal end portion of the tube vent 74 is inserted into the bag body 60 through the second hole 76. The outer diameter of the distal end portion of the tube vent 74 with a tapered shape, which is inserted through the second hole 76, is smaller than the inner diameter of the second hole 76. Also, a proximal end portion of a tether 78 is fixed to the distal end portion of the tube vent 74. The tether 78 functions as a connecting member, and a holding portion. As shown in FIG. 6, a distal end portion of the tether 78 extends to the outside of the base plate 12 through the inside of the bag body 60 and a small hole 80 formed in the bottom wall 20 of the base plate 12.

In addition, as shown in FIG. 1 and FIG. 3, a first hole 82 is formed in the side foundation cloth 64. A tube vent 84 with a cylindrical shape, which corresponds to the first hole 82, is provided in the side foundation cloth 64. In the embodiment, both ends of the tube vent 84 are open, as well as the tube vent 74. Further, the tube vent 84 gradually becomes narrower from a proximal end portion to a distal end portion when the airbag 30 is in the deployed state. The proximal end portion of the tube vent 84 (i.e., the open end at the proximal end side) is connected to the peripheral edge of the first hole 82. Communication is provided between the tube vent 84 and the inside of the bag body 60 through the first hole 82.

Further, a second hole 86 is formed on a side of the first hole 82 (particularly in the embodiment, the second hole 86 is positioned ahead of the first hole 82 when the airbag 30 is in the inflated and deployed state), in the side foundation cloth 64. The second hole 86 is positioned at the predetermined distance from the first hole 82. A portion of the tube vent 84 on the distal end side of the proximal end portion is positioned outside the bag body 60. However, the distal end portion of the tube vent 84 is inserted into the bag body 60 through the second hole 86. The outer diameter of the distal end portion of the tube vent 84 with a tapered shape, which is inserted through the second hole 86, is smaller than the inner diameter of the second hole 86. Also, a proximal end portion of a tether 88 is fixed to the distal end portion of the tube vent 84. The tether 88 functions as the connecting member, and the holding portion. A distal end portion of the tether 88 extends through the inside of the bag body 60, and extends through the small hole 80 together with the tether 78. Thus, the distal end portion of the tether 88 extends to the outside of the base plate 12.

As shown in FIG. 5, a tether holding device 100, which functions as the holding portion, is provided on the rear surface side of the base plate 12. As shown in FIG. 6, the tether holding device 100 includes a micro gas generator 122. The micro gas generator 122 includes a cylinder 124. The axial direction of the cylinder 124 extends in parallel with the outer surface of the bottom wall 20. A piston (not shown) is housed in the cylinder 124 in a manner such that the piston slides in the axial direction of the cylinder 124. A proximal end portion of a rod 126 is integrally connected to one end of the piston in the axial direction of the cylinder 124. A distal end portion of the rod 126 extends to the outside of the cylinder 124. A slider 128 is connected to the distal end of the rod 126. The slider 128 includes a connecting piece 130.

The connecting piece 130 has a plate shape. The thickness direction of the connecting piece 130 extends in the axial direction of the cylinder 124. The longitudinal direction of the connecting piece 130 extends in substantially parallel with the outer surface of the bottom wall 20. The distal end of the rod 126 is integrally connected to one surface of the connecting piece 130 in the thickness direction thereof at one end side of the connecting piece 130 in the longitudinal direction thereof. A holding piece 132 is formed at one end of the connecting piece 130 in the width direction thereof (i.e., the end close to the bottom wall 20) at the other end side of the connecting piece 130 in the longitudinal direction thereof. The holding piece 132 has a plate shape. Each of the longitudinal direction and the width direction of the holding piece 132 extends in substantially parallel with the outer surface of the bottom wall 20. A proximal end portion of the holding piece 132 in the longitudinal direction thereof is connected to the connecting piece 130. The direction toward the distal end portion of the holding piece 132 in the longitudinal direction thereof is opposite to the direction toward the distal end portion of the rod 126 in the longitudinal direction thereof.

The holding piece 132 extends above the small hole 80 formed in the bottom wall 20 of the base plate 12. The holding piece 132 is inserted through a loop 134 with a ring shape formed at the distal end portion of the tether 78 and a loop 136 with a ring shape formed at the distal end portion of the tether 88. Because the holding piece 132 is inserted through the loops 134 and 136, the distal end portions of the tethers 78 and 88 are restricted from moving toward the inside of the base plate 12 through the small hole 80.

Also, a gas-generating agent and an ignition device are housed in the cylinder 124 (more specifically, in the cylinder 124, the gas-generating agent and the ignition device are disposed at a side opposite to a side where the rod 126 of the piston is disposed). When the gas-generating agent is burned, gas is instantaneously generated. The ignition device ignites the gas-generating agent based on an ignition signal from a control portion such as an airbag ECU (not shown). When the gas is generated in the cylinder 124 by burning the gas-generating agent, and a pressure in the cylinder 124 is increased, the piston slides in the cylinder 124. When the piston thus slides, the rod 126 slides, and further, the slider 128 moves away from the cylinder 124. When the slider 128 thus moves, and accordingly, the holding piece 132 moves out of the loops 134 and 136, the holding piece 132 releases the tethers 78 and 88. As a result, the distal end portions of the tethers 78 and 88 move to the inside of the base plate 12 through the small hole 80.

The tether holding device 100 further includes a fixation member 142. The fixation member 142 includes a base portion 144 with a plate shape. A generator holding piece 146 extends from the base portion 144. The generator holding piece 146 is curved along the outer peripheral shape of the cylinder 124 in a manner such that the generator holding piece 146 is open toward the bottom wall 20. The cylinder 124 is disposed inside the generator holding piece 146. When the fixation member 142 is screwed to the bottom wall 20, the cylinder 124 is held by the generator holding piece 146 and the bottom wall 20.

A slide guide 148 extends from a position in the base portion 144, which faces the distal end portion of the holding piece 132. The slide guide 148 extends in the longitudinal direction of the holding piece 132. The slide guide 148 is formed so that there is a gap between a distal end portion of the slide guide 148 and the outer surface of the bottom wall 20, and the gap is slightly larger than the thickness of the holding piece 132. The holding piece 132 is inserted between the slide guide 148 and the bottom wall 20. A rectangular hole 150, which faces the small hole 80, is formed in the slide guide 148. The holding piece 132 is inserted through the loops 134 and 136, and portions of the loops 134 and 136, which are located closer to the slide guide 148 than to the holding piece 132, are inserted into the hole 150.

[Advantageous effects obtained in the first embodiment]
Next, advantageous effects obtained in the first embodiment will be described.

In the airbag apparatus 10, when a vehicle-state detection sensor, such as an acceleration sensor, detects that the vehicle is rapidly decelerated, and a detection signal output from the vehicle-state detection sensor is input to the control portion such as the airbag ECU, an ignition device (not shown) provided in the inflator 40 is operated. When the ignition device of the inflator 40 is operated, the gas-generating agent in the inflator 40 is burned by the ignition device. When the gas-generating agent is burned, a large amount of gas is instantaneously generated.

The gas thus generated in the inflator 40 is discharged to the outside of the inflator 40 from the portion of the inflator 40, which is located above the bottom wall 20. Because the inflator 40 is provided inside the open end portion of the airbag 30, the gas discharged from the inflator 40 is supplied into the airbag 30. Because the gas is supplied into the airbag 30, the airbag 30 is inflated. The inflated airbag 30 presses the airbag door 50 from the rear side of the instrument panel 16. When the airbag 30 presses the airbag door 50, the instrument panel 16 is broken at the breaking portion 54, and the airbag door 50 pivots around the hinge portion 52. Thus, a rectangular hole is formed in the instrument panel 16, and accordingly, the inflated airbag 30 is deployed ahead of the seat that faces the airbag apparatus 10, in the cabin of the vehicle 14, as shown in FIG. 3.

If the airbag 30 is in the deployed state in the cabin of the vehicle 14, and an occupant seated on the seat that faces the airbag apparatus 10 is about to move toward the front of the vehicle 14 due to inertia that occurs when the vehicle is rapidly decelerated, the deployed airbag 30 receives the body of the occupant.

When the airbag 30 is thus inflated and deployed, the gas is supplied into the tube vents 74 and 84 through the first holes 72 and 82, respectively. As a result, the tube vents 74 and 84 are inflated. The distal end portion of the tube vent 74 is inserted into the bag body 60 through the second hole 76, and the distal end portion of the tube vent 84 is inserted into the bag body 60 through the second hole 86. Therefore, when the tube vents 74 and 84 are inflated, the tube vents 74 and 84 are about to move out of the second holes 76 and 86, respectively, due to tensional forces of the tube vents 74 and 84.

However, for example, in the case where it is determined that the physical size of the occupant seated on the seat is not small based on a signal from an occupant physical size detection sensor such as a load sensor provided in the seat, the micro gas generator 122 is not operated. Therefore, the holding piece 132 remains inserted through the loop 134 of the tether 78 and the loop 136 of the tether 88. Accordingly, the distal end portion of the tube vent 74, which is connected to the proximal end portion of the tether 78, cannot move out of the second hole 76, and the distal end portion of the tube vent 84, which is connected to the proximal end portion of the tether 88, cannot move out of the second hole 86. Therefore, when the airbag apparatus 10 is in this state, even if the gas in the bag body 60 flows through the first holes 72 and 82, and further flows through the tube vents 74 and 84, the gas returns into the airbag 30. This suppresses leakage of the gas in the airbag 30 to the outside of the airbag 30 through the tube vents 74 and 84.

Also, the second holes 76 and 86 are formed in the bag body 60. When the tube vents 74 and 84 are inflated, large parts of the second holes 76 and 86 are closed by the tube vents 74 and 84, respectively. Therefore, when the airbag 30 is in the inflated and deployed state, gas leakage through the second holes 76 and 86 is effectively suppressed. Accordingly, when the airbag 30 is in the inflated and deployed state, the pressure in the airbag 30 is maintained, and the body of the relatively large occupant is effectively received.

In contrast, for example, in the case where it is determined that the physical size of the occupant seated on the seat is small based on the signal from the occupant physical size detection sensor such as the load sensor provided in the seat, when the control portion such as the airbag ECU outputs the ignition signal to the ignition device of the inflator 40, the control portion also outputs the ignition signal to the ignition device of the micro gas generator 122. When the ignition device of the micro gas generator 122 is operated, the gas-generating agent in the cylinder 124 is burned, and the gas is generated in the cylinder 124. As a result, the pressure in the cylinder 124 is increased, and accordingly, the piston slides in the cylinder 124.

When the piston slides, and accordingly, the rod 126 slides, the slider 128 moves away from the cylinder 124. As a result, the holding piece 132 slides, and moves out of the loops 134 and 136. When the holding piece 132 thus moves out of the loops 134 and 136, the holding piece 132 releases the tethers 78 and 88. When the airbag 30 is inflated and deployed, the gas is supplied into the tube vents 74 and 84 through the first holes 72 and 82, and accordingly, the tube vents 74 and 84 are about to be straightened.

The tube vents 74 and 84, which are about to be straightened, pull the tethers 78 and 88. When the airbag apparatus 10 is in this state, the holding piece 132 does not hold the tethers 78 and 88, and therefore, the distal end portions of the tethers 78 and 88 can pass through the small hole 80. Therefore, the tube vents 74 and 84 are straightened while the tube vents 74 and 84 pull the tethers 78 and 88, respectively so that the tethers 78 and 88 pass through the small hole 80. Further, as shown in FIG. 4, the tube vent 74 moves out of the second hole 76, and the tube vent 84 moves out of the second hole 86. When the airbag apparatus 10 is in this state, communication is provided between the inside and outside of the airbag 30 through the first holes 72 and 82 and the tube vents 74 and 84. Therefore, the gas in the airbag 30 is discharged to the outside of the airbag 30 through the first holes 72 and 82, and the tube vents 74 and 84.

Also, as described above, the second holes 76 and 86, which have been closed by the tube vents 74 and 84, respectively, are opened when the tube vents 74 and 84 are straightened, and move out of the second holes 76 and 86, respectively. Therefore, the gas in the airbag 30 is discharged also through the second holes 76 and 86. Thus, when the relatively small occupant is received by the airbag 30, the tension of the airbag 30 is low.

As described above, in the airbag apparatus 10, when the holding piece 132 is inserted through the loops 134 and 136, and therefore, the distal end portions of the tube vents 74 and 84 cannot move out of the second holes 76 and 86, respectively, it is possible to suppress the leakage of the gas to the outside of the airbag 30 through the first holes 72 and 82 and the tube vents 74 and 84. It is also possible to effectively suppress the gas leakage through the second holes 76 and 86 closed by the tube vents 74 and 84, respectively. Thus, it is possible to quickly inflate and deploy the airbag 30 without the need of increasing the size of the inflator 40.

Further, when the holding piece 132 does not hold the proximal end portions of the tethers 78 and 88, and the tube vents 74 and 84 are straightened by the pressure in the airbag 30, and accordingly, the tube vents 74 and 84 move out of the second holes 76 and 86, respectively, communication is provided between the inside and outside of the airbag 30 through openings at distal ends of the tube vents 74 and 84 connected to the peripheral edges of the first holes 72 and 82, and through the second holes 76 and 86, without the need of reversing the tube vents 74 and 84 (i.e., without the need of turning the tube vents 74 and 84 inside out). Thus, it is possible to quickly reduce (adjust) the pressure in the airbag 30. The outer diameter of the distal end portion of each of the tube vents 74 and 84, which are inserted through the second holes 76 and 86, is smaller than the inner diameter of each of the second holes 76 and 86. Therefore, even when the tube vents 74 and 84 are in the inflated stated, the tube vents 74 and 84 do not suffer unnecessarily great interference from the inner peripheral portions of the second holes 76 and 86. Accordingly, when the holding pieces 132 releases the distal end portions of the tube vents 74 and 84, and the tube vents 74 and 84 protrude to the outside of the airbag 30, the tube vents 74 and 84 do not suffer great interference from the inner peripheral portions of the second holes 76 and 86, and the distal end portions of the tube vents 74 and 84 smoothly move out of the second holes 76 and 86. Also, because the distal end portions of the tube vents 74 and 84 are tapered, it is possible to greatly reduce the interference from the inner peripheral portions of the second holes 76 and 86 when the distal end portions of the tube vents 74 and 84 move out of the second holes 76 and 86. Thus, the tube vents 74 and 84 even more smoothly protrude to the outside of the airbag 30.

In the embodiment, the first hole 72 and the second hole 76 are formed, and the tube vent 74 is provided in the side foundation cloth 62, and the first hole 82 and the second hole 86 are formed, and the tube vent 84 is provided in the side foundation cloth 64. However, the configuration may be such that the first hole, the second hole, and the tube vent are provided only one of the side foundation cloths. That is, the configuration may be such that the first hole 72 and the second hole 76 are formed, and the tube vent 74 is provided in the side foundation cloth 62, while the first hole 82 and the second hole 86 are not formed, and the tube vent 84 is not provided in the side foundation cloth 64. Also, the configuration may be such that the first hole 82 and the second hole 86 are formed, and the tube vent 84 is provided in the side foundation cloth 64, while the first hole 72 and the second hole 76 are not formed, and the tube vent 74 is not provided in the side foundation cloth 62.

Also, in the embodiment, the distal end of each of the tube vent 74 and the tube vent 84 is open. After the distal end portions of the tube vents 74 and 84 move out of the second holes 76 and 86, respectively, communication is provided between the inside and outside of the airbag 30 through the first holes 72 and 82 and the tube vents 74 and 84. However, the configuration may be such that the distal end of each of the tube vent 74 and the tube vent 84 is closed. In this configuration, even when the distal end portions of the tube vents 74 and 84 move out of the second holes 76 and 86, respectively, communication is not provided between the inside and outside of the airbag 30 through the first holes 72 and 82 and the tube vents 74 and 84. Communication is provided between the inside and outside of the airbag 30 only through the second hole 76 and the second hole 86.

Further, in the embodiment, when the holding piece 132 is inserted through the loops 134 and 136 of the tethers 78 and 88, the holding piece 132 holds the distal end portions of the tethers 78 and 88. When the holding piece 132 moves out of the loops 134 and 136, the holding piece 132 releases the distal end portions of the tethers 78 and 88. However, the configuration for holding and releasing the distal end portions of the tethers 78 and 88 is not limited to the configuration in the embodiment. For example, the configuration may be such that the slide guide 148 holds the distal end portions of the tethers 78 and 88. In this configuration, when the micro gas generator 122 is operated, a cutter slides and cuts the tethers 78 and 88, and thus, the slide guide 148 releases the tethers 78 and 88.

[Second embodiment] Next, a second embodiment of the invention will be described. In the description of the second embodiment, basically, the same and corresponding portions as those in the first embodiment are denoted by the same reference numerals, and the detailed description thereof will be omitted.

Figure 7:
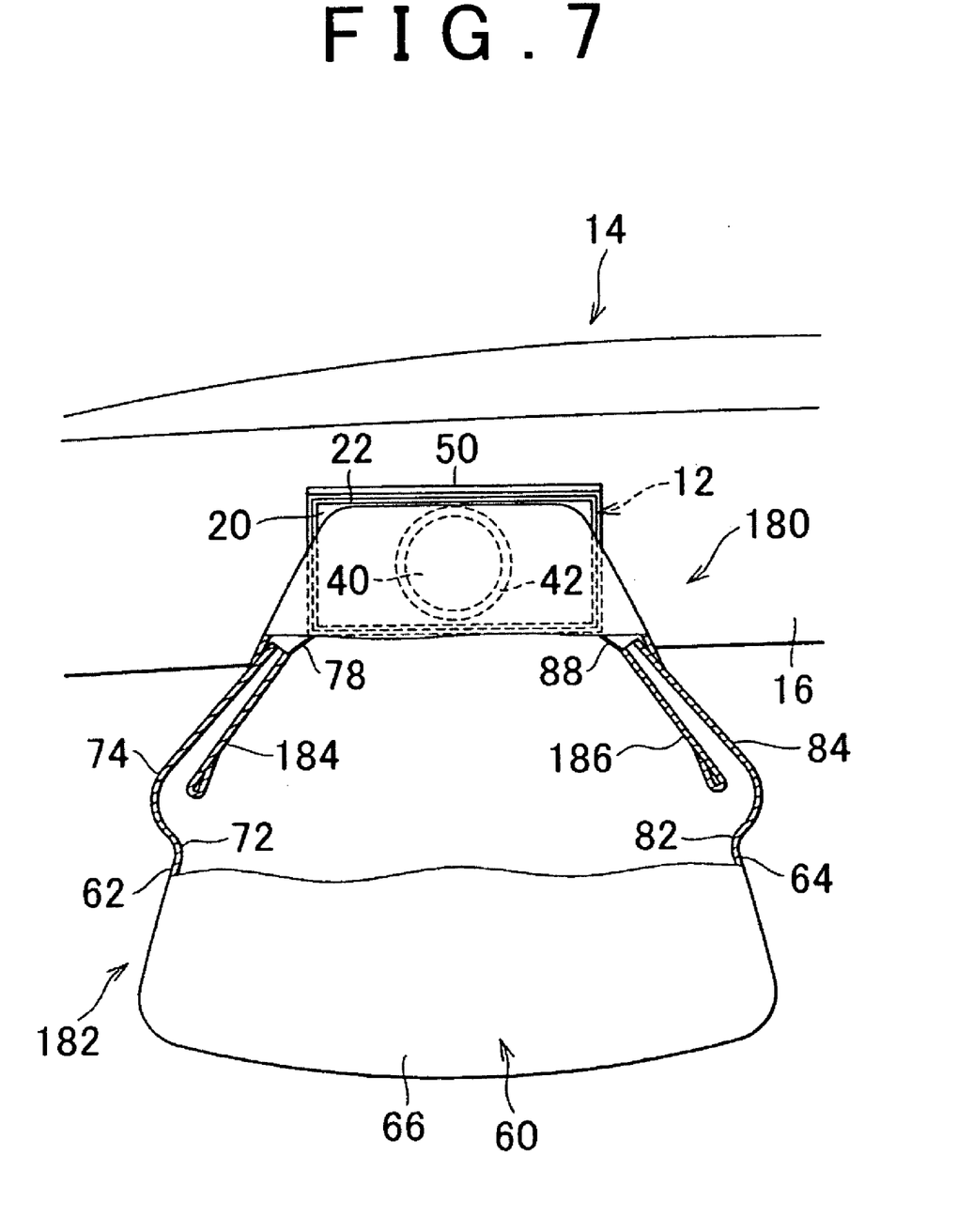
FIG. 7 is a plan view showing an airbag apparatus according to a second embodiment, FIG. 7 corresponding to FIG. 3.

FIG. 7 is a plan view showing a configuration of an airbag apparatus 180 according to the second embodiment. As shown in FIG. 7, the airbag apparatus 180 does not include the airbag 30. The airbag apparatus 180 includes an airbag 182 instead of the airbag 30. The airbag 182 includes the bag body 60 and the tube vents 74 and 84, as well as the airbag 30 in the first embodiment. However, the second hole 76 is not formed in the side foundation cloth 62 of the bag body 60 of the airbag 182. Instead of the second hole 76, a second hole 184 is formed in the side foundation cloth 62 of the bag body 60 of the airbag 182. Also, the second hole 86 is not formed in the side foundation cloth 64 of the bag body 60 of the airbag 182. Instead of the second hole 86, a second hole 186 is formed in the side foundation cloth 64 of the bag body 60 of the airbag 182.

Figure 9:
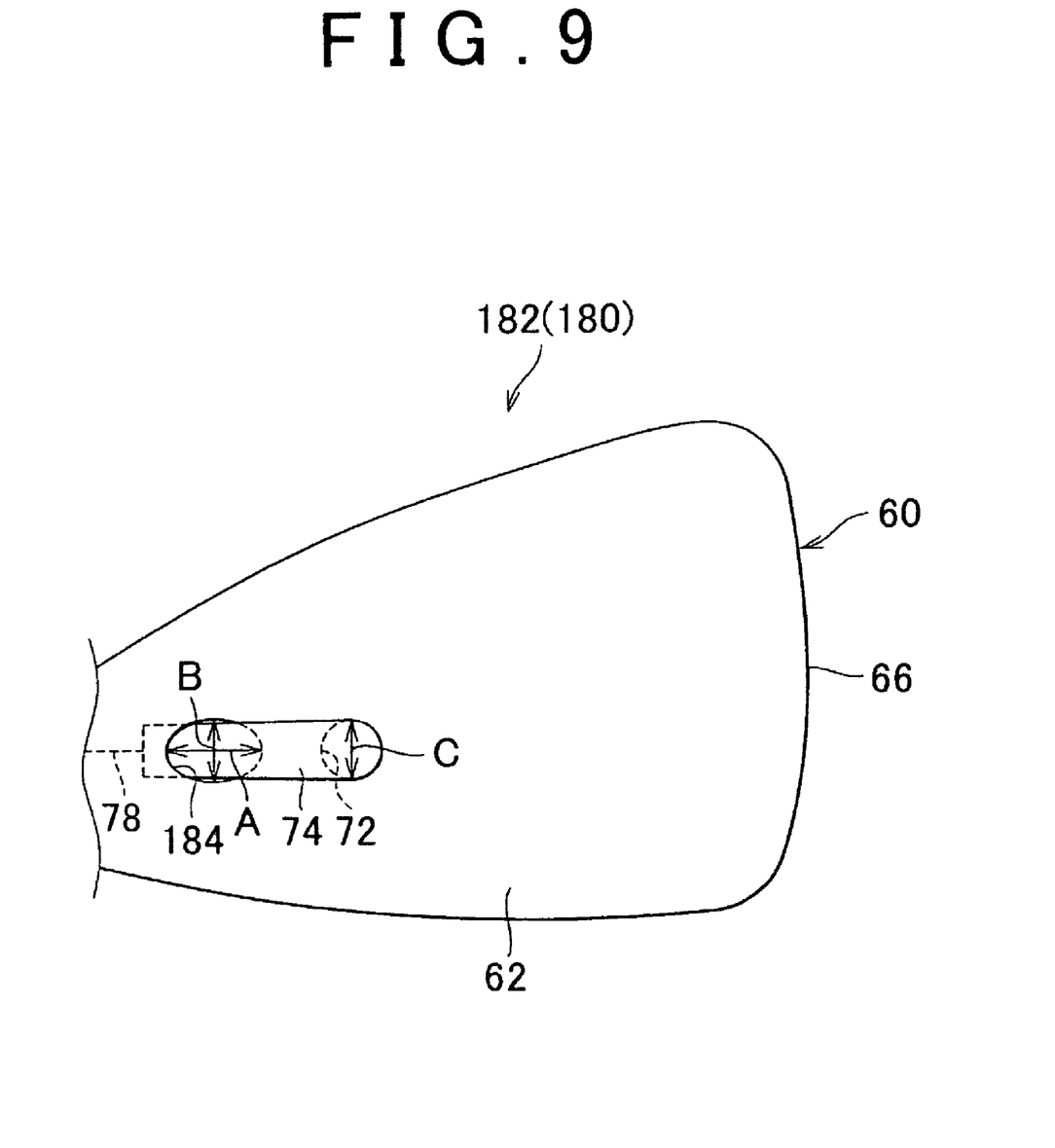
FIG. 9 is a side view showing the airbag apparatus according to the second embodiment when the airbag is deployed, FIG. 9 corresponding to FIG. 7.

As shown in FIG. 9, each of the second holes 184 and 186 is a long hole (or an elliptical hole). The longitudinal direction of each of the second holes 184 and 186 substantially extends in the longitudinal direction of the vehicle 14 (in FIG. 9, only the second hole 184 is shown, and the second hole 186 is omitted). The inner peripheral length of each of the second holes 184 and 186 is longer than the inner peripheral length of each of the first holes 72 and 82 (in FIG. 9, only the first hole 72 is shown, and the first hole 82 is omitted). The length of the minor axis of each of the second holes 184 and 186 (i.e., the length shown by the arrow B in FIG. 9) is longer than the inner diameter of each of the first holes 72 and 82 (i.e., the length shown by the arrow C in FIG. 9). The length of the minor axis of each of the second holes 184 and 186 is the length of each of the second holes 184 and 186 in a direction substantially orthogonal to the direction of the major axis of each of the second holes 184 and 186 (i.e., the direction shown by the arrow A in FIG. 9). The length of the minor axis of the second hole 184 is longer than the outer diameter of the tube vent 74 at a position corresponding to a position of the second hole 184. The length of the minor axis of the second hole 186 is longer than the outer diameter of the tube vent 84 at a position corresponding to a position of the second hole 186 (in FIG. 9, only the tube vent 74 is shown, and the tube vent 84 is omitted).

Further, as shown in FIG. 7, in the airbag apparatus 180, the tube vent 74 is inserted through the second hole 184 in a manner such that the tube vent 74 is inclined with respect to a portion of the surface of the side foundation cloth 62 of the bag body 60, the portion of the surface being located around the second hole 184. The tube vent 84 is inserted through the second hole 186 in a manner such that the tube vent 84 is inclined with respect to a portion of the surface of the side foundation cloth 64 of the bag body 60, the portion of the surface being located around the second hole 186. That is, the tube vents 74 and 84 are inserted through the second holes 184 and 186, respectively, in a manner such that the tube vents 74 and 84 are inclined with respect to the second holes 184 and 186, respectively. In the airbag apparatus 180, the inner peripheral length of the second hole 184 is longer than the outer peripheral length of the cross section of the tube vent 74 taken along the direction orthogonal to the direction that extends from the outside of the airbag 30 to the inside of the airbag 30 through the second hole 184, at the position corresponding to the position of the second hole 184. The inner peripheral length of the second hole 186 is longer than the outer peripheral length of the cross section of the tube vent 84 taken along the direction orthogonal to the direction that extends from the outside of the airbag 30 to the inside of the airbag 30 through the second hole 186, at the position corresponding to the position of the second hole 186.

Figure 8:
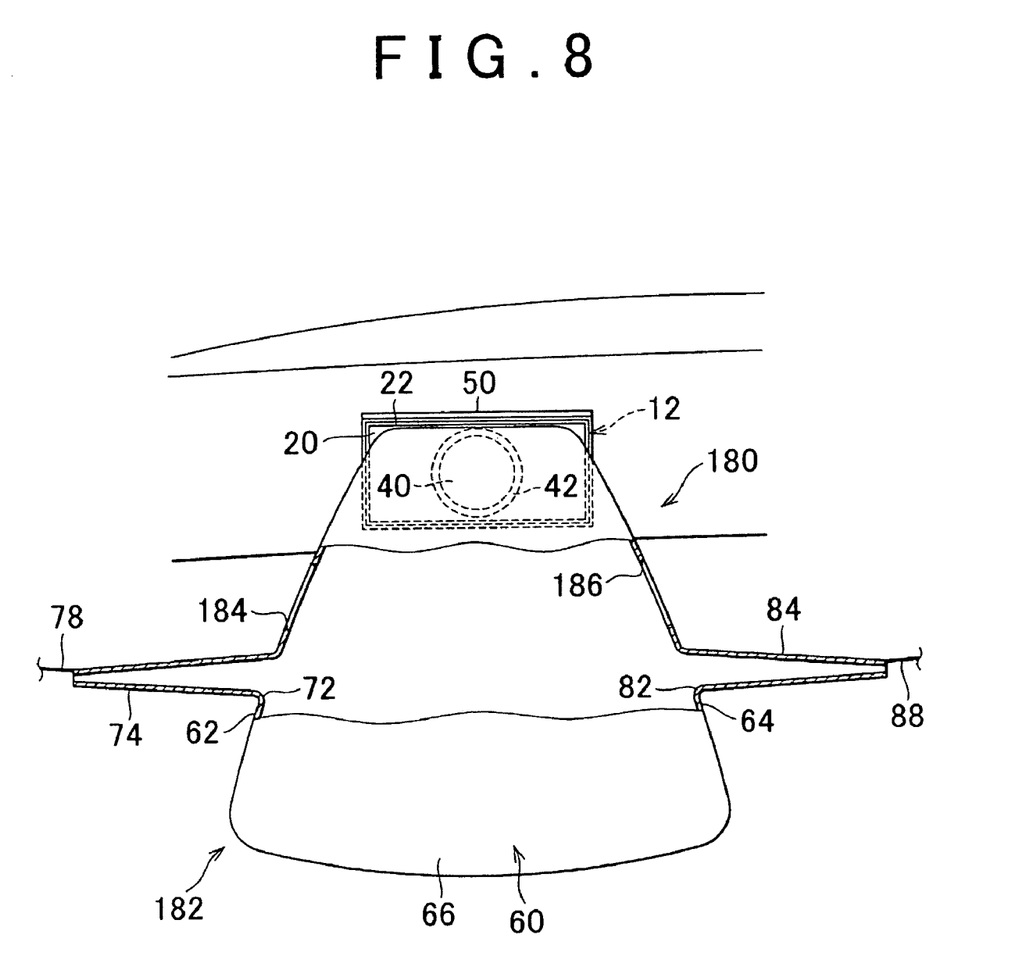
FIG. 8 is a plan view showing the airbag apparatus according to the second embodiment, FIG. 8 corresponding to FIG. 4.

As described above, when the distal end portions of the tube vents 74 and 84 are inserted through the long second holes 184 and 186, and the distal end portions of the tube vents 74 are held, the long second holes 184 and 186 are substantially closed by the tube vents 74 and 84 that are inserted through the second holes 184 and 186, respectively, in a manner such that the tube vents 74 and 84 are inclined with respect to the second holes 184 and 186, respectively. Thus, it is possible to suppress the gas leakage from the bag body 60. In the airbag apparatus 180 in which the diameter and the inner peripheral length (that is, the inner peripheral shape) of each of the second holes 184 and 186 is set, each of the second holes 184 and 186 is larger than each of the first holes 72 and 82. Further, the inner peripheral shape of each of the second holes 184 and 186 is larger than the outer peripheral shape of each of the tube vents 74 and 84. Therefore, when the holding piece 132 releases the distal end portions of the tethers 78 and 88, and the tube vents 74 and 84 are about to be straightened, and about to move out of the second holes 184 and 186, respectively, the tube vents 74 and 84 do not suffer great interference from the inner peripheral portions of the second holes 184 and 186. Thus, as shown in FIG. 8, the tube vents 74 and 84 smoothly move out of the second holes 184 and 186, respectively, to the outside of the bag body 60, and accordingly, the tube vents 74 and 84 are straightened. Also, when the distal end portions of the tube vents 74 and 84 are released, and the tube vents 74 and 84 move out of the second holes 184 and 186, respectively, the distal end portions of the tube vents 74 and 84 move in the longitudinal direction of the long second holes 184, and 186. Thus, the tube vents 74 and 84 more smoothly move out of the second holes 184 and 186.

In the embodiment, each of the second holes 184 and 186 is a long hole. However, each of the second holes 184 and 186 may be a circular hole that is larger than the outer peripheral shape of each of the first holes 72 and 82, and the outer peripheral shape of each of the tube vents 74 and 84.

What is claimed is:

1. An airbag apparatus comprising:
   an airbag which is inflated and deployed when gas is supplied into the airbag and a pressure in the airbag is increased, and in which a first hole and a second hole are formed, wherein each of the first hole and the second hole provides communication between an inside of the airbag and an outside of the airbag;
   a tube with a cylindrical shape disposed outside the airbag, wherein a proximal end portion of the tube is connected to a portion of the airbag, which is located around the first hole, so that communication is provided between an inside of the tube and the inside of the airbag through the first hole, and a distal end portion of the tube is inserted from the outside of the airbag into the inside of the airbag through the second hole; and
   a holding portion that holds the distal end portion of the tube from the inside of the airbag, wherein when the airbag is inflated and deployed, and the holding portion releases the tube, the distal end portion of the tube moves out of the second hole so that the tube protrudes to the outside of the airbag.

2. The airbag apparatus according to claim 1, wherein the tube is a tube vent whose distal end is open.

3. The airbag apparatus according to claim 2, wherein an inner peripheral shape of the second hole is larger than an outer peripheral shape of the distal end portion of the tube.

4. The airbag apparatus according to claim 3, wherein when the tube is inserted through the second hole, the second hole is larger than an outer peripheral shape of a cross section of the tube taken along a radial direction of the second hole at a position in the tube corresponding to a position of the second hole.

5. The airbag apparatus according to claim 2, wherein when the tube is inserted through the second hole, the second hole is larger than an outer peripheral shape of a cross section of the tube taken along a radial direction of the second hole at a position in the tube corresponding to a position of the second hole.

6. The airbag apparatus according to claim 1, wherein an inner peripheral shape of the second hole is larger than an outer peripheral shape of the distal end portion of the tube.

7. The airbag apparatus according to claim 6, wherein when the tube is inserted through the second hole, the second hole is larger than an outer peripheral shape of a cross section of the tube taken along a radial direction of the second hole at a position in the tube corresponding to a position of the second hole.

8. The airbag apparatus according to claim 1, wherein when the tube is inserted through the second hole, the second hole is larger than an outer peripheral shape of a cross section of the tube taken along a radial direction of the second hole at a position in the tube corresponding to a position of the second hole.

* * * * *